United States Patent
Ito et al.

(10) Patent No.: US 8,150,558 B2
(45) Date of Patent: Apr. 3, 2012

(54) TEMPERATURE CONTROL METHOD AND TEMPERATURE CONTROLLER

(75) Inventors: Kikukatsu Ito, Morioka (JP); Takanori Ito, Morioka (JP); Hiroshi Osada, Morioka (JP); Shigeki Chiba, Morioka (JP)

(73) Assignee: Iwate University, Morioka-Shi (JP)

( * ) Notice: Subject to any disclaimer, the term of this patent is extended or adjusted under 35 U.S.C. 154(b) by 356 days.

(21) Appl. No.: 11/721,066

(22) PCT Filed: Dec. 8, 2004

(86) PCT No.: PCT/JP2004/018297
§ 371 (c)(1),
(2), (4) Date: Jul. 6, 2007

(87) PCT Pub. No.: WO2006/061892
PCT Pub. Date: Jun. 15, 2006

(65) Prior Publication Data
US 2008/0215188 A1    Sep. 4, 2008

(51) Int. Cl.
*G05D 23/00* (2006.01)
(52) U.S. Cl. .............. 700/299; 700/300; 432/36
(58) Field of Classification Search .......... 700/37, 700/40, 153, 205, 299, 43, 45, 29, 32, 300; 436/36; 236/3; 165/200
See application file for complete search history.

(56) References Cited

U.S. PATENT DOCUMENTS

| | | | | |
|---|---|---|---|---|
| 3,922,535 A * | 11/1975 | Randolph | ............ | 700/40 |
| 5,129,033 A * | 7/1992 | Ferrara et al. | ............ | 392/447 |
| 5,481,453 A * | 1/1996 | Desantis | ............ | 700/42 |
| 5,485,367 A * | 1/1996 | Hiroi | ............ | 700/40 |
| 5,619,422 A * | 4/1997 | Nakazawa et al. | ............ | 700/299 |
| 5,818,714 A * | 10/1998 | Zou et al. | ............ | 700/37 |
| 5,848,535 A * | 12/1998 | Sibik | ............ | 62/99 |
| 6,424,873 B1 * | 7/2002 | Przybylski | ............ | 700/42 |
| 6,529,796 B1 * | 3/2003 | Kroeger et al. | ............ | 700/202 |
| 6,684,113 B2 * | 1/2004 | Tanaka | ............ | 700/40 |
| 7,085,628 B2 * | 8/2006 | Ohmi et al. | ............ | 700/299 |
| 7,415,312 B2 * | 8/2008 | Barnett et al. | ............ | 700/29 |
| 7,483,769 B2 * | 1/2009 | Hoover et al. | ............ | 700/299 |
| 7,496,336 B2 * | 2/2009 | Menkhoff | ............ | 455/230 |
| 2003/0005707 A1 | 1/2003 | Ookura et al. | | |
| 2006/0178784 A1 * | 8/2006 | Stewart et al. | ............ | 700/299 |
| 2008/0092554 A1 * | 4/2008 | Okamoto et al. | ............ | 62/3.7 |
| 2008/0269955 A1 * | 10/2008 | Yasui et al. | ............ | 700/299 |

FOREIGN PATENT DOCUMENTS

| EP | 0 132 345 A2 | 1/1985 |
|---|---|---|
| JP | 2000-163101 A1 | 6/2000 |
| JP | 2001-092501 A1 | 4/2001 |

(Continued)

OTHER PUBLICATIONS

Kikukatsu Ito, Takanori Ito, Yoshihiko Onda, and Matsuo Uemura. Temperature-Triggered Periodical Thermogenic Oscillations in Skunk Cabbage (*Symplocarpus foetidus*). Plant Cell Physiology, Mar. 2004 v45: pp. 257-264.*

(Continued)

*Primary Examiner* — Dave Robertson

(74) *Attorney, Agent, or Firm* — Burr & Brown

(57) ABSTRACT

The temperature of an object is controlled by a feedback control algorithm based on the temperature control characteristics of a homeothermic plant.

2 Claims, 3 Drawing Sheets

FOREIGN PATENT DOCUMENTS

| | | |
|---|---|---|
| JP | 2004-110405 A1 | 4/2004 |
| JP | 2004-174036 A1 | 6/2004 |
| JP | 2004-242643 A1 | 9/2004 |

OTHER PUBLICATIONS

Seymour, R. and Blaylock, A. Switching off the heater: influence of ambient temperature on thermoregulation by eastern skunk cabbage *Symplocarpus foetidus*. Journal of Experimental Botany, v50, 1999, pp. 1525-1532.*

K. Ito, Y. Onda, T. Sato, Y. Abe & M. Uemura. Structural requirements for the perception of ambient temperature signals in homeothermic heat production of skunk cabbage (*Symlocarpus foetidus*). Plant, Cell & Environment, vol. 26, Issue 6, 2003, pp. 783-788.*

Seymour, R. Dynamics and precision of thermoregulatory responses of eastern skunk cabbage *Symplocarpus foetidus*. Plant, Cell & Environment, vol. 27, Issue 8, Date: Aug. 2004, pp. 1014-1022.*

K. Takahashi, T. Ito, T. Endo, S. Chiba, K. Ito and H. Osada. Algorithm for Temperature Control in the Skunk Cabbage, *Symplocarpus foetidus*, Biotechnology & Biotechnological Equipment, Diagnosis, 2008, vol. 22, No. 4. pp. 959-963.*

Tanner, J.A.: Feedback control in living prototypes: A new vista in control engineering. Medical and Biological Engineering and Computing 1(3), 333-351 (1963).*

Knutson, Roger M. Heat Production and Temperature Regulation in Eastern Skunk Cabbage. Science, New Series, vol. 186, No. 4165 (Nov. 22, 1974), pp. 746-747.*

Lamprecht, I and Schmolz, E. Thermal investigations in whole plants and plant tissues. In: D. Lörinczy, Editor, The Nature of Biological Systems as Revealed by Thermal Methods, Kluwer Academic Publisher, Dordrecht (2004), pp. 187-214 (Chapter 8).*

Don B. DeYoung, "*Discovery of Design*," Creation Matters, Creation Research Society 2004, vol. 9, No. 5, Sep./Oct. 2004, pp. 1-10.

Abstract of Takanori Ito, et al., "*Are Body Temperatures of Plats Chaotic? Nonlinear Analyses of Temperatures in the Spadix of Skunk Cabbage, Symplocarpus foetidus;*" p. 19, Dynamic Days 2004—23rd Annual International Conference on Nonlinear Dynamics and Complex Systems, Jan. 2-5, 2004, pp. 1-32. URL: http://cncs.pratt.duke.edu/DDays2004/abstracts.pdf.

* cited by examiner $T_{set}$: Target value, $T$: Controlled target value, $e$: Deviation,
$K_P$: Proportional coefficient, $K_I$: Integral coefficient,
$K_D$: Differential coefficient, $Q$: Amount of operation

TEMPERATURE CONTROL METHOD AND TEMPERATURE CONTROLLER

FIELD OF THE INVENTION

The present invention relates to a method for temperature control, and a temperature controller.

BACKGROUND OF THE INVENTION

As an automatic control method, which controls an amount of operation provided for a controller to follow in target range value under conditions of various state variables such as temperature, pressure, flow, and level of controlled object change in time, PID (proportional, integral, differential) control method is known. PID control is especially used extensively in the field of temperature control (constant temperature control).

FIG. 1 is a flow chart illustrating an embodiment of a conventional temperature control algorithm based on PID control. As shown in FIG. 1, in the temperature control using PID control, a sufficient high-speed response could not be realized, because the amount of operation of the heater is always determined based on a deviation between a target value (target temperature) and a present value (present temperature) processed by operation with respect to each coefficient of proportional, integral, differential elements, and therefore, the amount of operation of every time is large, and requires a long time at operation speed.

Moreover, each control coefficient of proportional, integral, differential elements ($K_p$, $K_I$, $K_D$) are introduced by mathematical techniques, and are basically not directly connected to a physics characteristic of the temperature-controlled object, and therefore, it is virtually impossible to theoretically seek the most suitable value of each aforementioned control coefficient, and therefore, each aforementioned control coefficient is determined by experiential perception or trial and error. From such a point of view, an accurate and high-speed response thereof could not be realized.

Furthermore, as shown in FIG. 1, the PID control requires an integral element to reach to the target value (target temperature), and therefore, the fact that the pulsation occurs cannot be avoided, which also makes it impossible to realize a sufficiently accurate and high-speed response.

Taking the above-described problems into consideration, various improvements are attempted for PID control. For example, a method for setting a set value is disclosed in Japanese Patent Application Laid-Open No. 2001-92501, in which the amount of control of a controlled object may accurately follow the target value of the controlled object during automatic control by following the target value that changes in time. Such control method has advantages in that it follows a set value precisely according to a characteristic of the system of the controlled object, and a servo-control system may be implemented.

Moreover, a PID control technique is disclosed in Japanese Patent Application Laid-Open No. 2001-163101, in which a PID control technique is characterized by including the steps of: calculating a deviation between a present value which is detected from a controlled object device and a set value which is a target value; operating PID control in response to the deviation calculating step, and then determining whether or not the present amount of operation of the controlled object device is in a predetermined range; outputting a control operation signal to the controlled object device with a PID control operation value multiplied by an output ratio, which is predetermined in response to the amount of operation within the predetermined range, if the present amount of operation is in the predetermined range and a sign of the deviation becomes inverse; and outputting a control operation signal to the controlled object device with a PID control operation value multiplied by an output ratio which is predetermined in response to the amount of operation corresponding to out of the predetermined range, if the present amount of operation is out of the predetermined range.

However, even using above-described PID controls, temperature control with an accurate and high-speed response has not been achieved.

SUMMARY OF THE INVENTION

Problems to be Solved by the Invention

An object of the present invention is to provide a new temperature control algorithm with an accurate and high-speed response, and to execute temperature control of an object at an accurate and high speed by using this temperature control algorithm.

Means for Solving the Problem

To achieve the object of the present invention, a method for controlling a temperature in accordance with the present invention is provided, characterized in that it comprises the steps of: preparing a temperature control algorithm based on the temperature response characteristics of a homeothermic plant; and controlling the temperature of the object by a feedback control using the temperature control algorithm.

Moreover, a temperature controller in accordance with the present invention is provided, comprising a heater for heating the object, and a temperature controller in communication with the heater for controlling the temperature of the object by feedback control that uses the temperature control algorithm.

The present inventors zealously executed the discussion to achieve the above-described purpose, and executed the search for the temperature control algorithm having an accurate and high-speed response to replace the conventional PID control. As a result, the present inventors have investigated the constant temperature characteristics of living organisms that exist in the natural world, and the constant temperature characteristics of a homeothermic plant was assumed based on grounds that it is possible to collect a homeothermic plant that has sufficient constant temperature characteristics in an extremely low temperature. For example, a plant known as skunk cabbage (Symplocarpus foetidus) grows naturally in the cold district in Iwate Prefecture in Japan, and can maintain a temperature to about 20 degrees Celsius even if the outside temperature falls below the freezing point.

Thus, the present inventors found that the aforementioned homeothermic plant has a temperature control algorithm with a superior high-speed and precise response by analyzing a temperature control mechanism of such a plant. The present inventors have controlled the temperature of an object by utilizing this temperature control algorithm.

According to one aspect of the present invention, the aforementioned temperature control includes: a first temperature control process for providing the amount of operation of a heater with a fixed value until a temperature of an object on the heater reaches a target temperature; and a second temperature control process for determining the amount of operation of the heater so that the amount of change in the temperature of the object, per each control cycle, is controlled to be zero after reaching the temperature of the target by the temperature of the object.

According to another aspect of the present invention, the aforementioned temperature control algorithm follows the equation (1) below;

$$\frac{d^2 Q}{dt^2} = C_1 \frac{dQ}{dt} + C_2 Q + C_3 (T_A - T_S) \tag{1}$$

(Q; Calorific value from a heater, $T_S$; Temperature of a heater, $T_A$; Outside temperature, $C_1$-$C_3$; Coefficients of the temperature characteristics of a target object).

Effect of the Invention

As described above, a new temperature control algorithm with an accurate and high-speed response is provided in accordance with the present invention. Thereby, the temperature control of an object may be implemented at an accurate and high speed.

DETAILED DESCRIPTION OF THE INVENTION

Hereafter, details, other features, and the advantageous effects of the present invention are described in detail.

Figure 1:
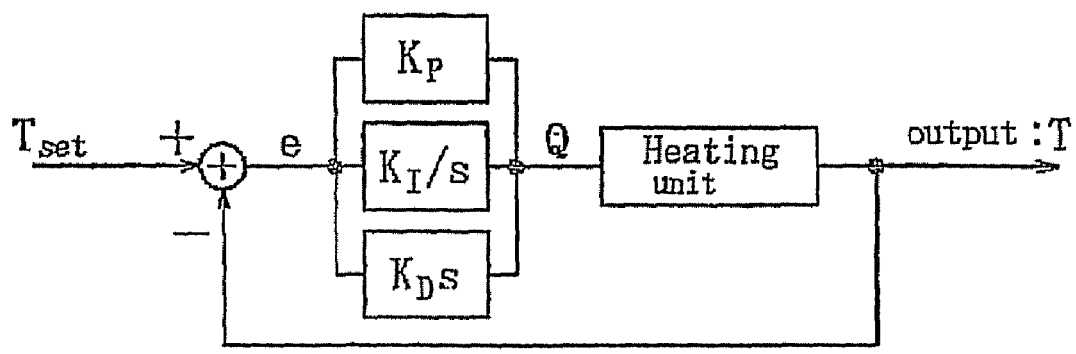
FIG. 1 is a flow chart showing a conventional PID control algorithm.
Figure 2:
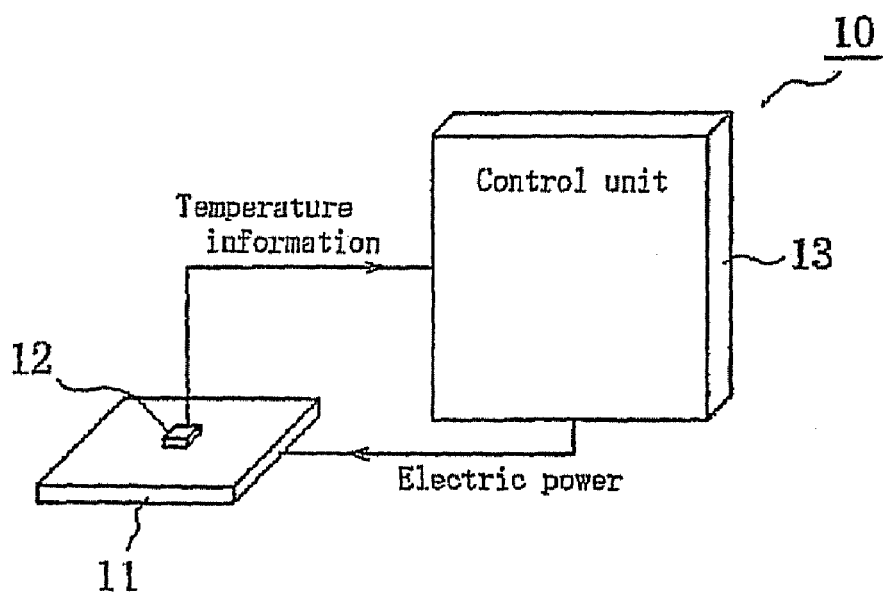
FIG. 2 is a block diagram showing an embodiment of a temperature controller in accordance with present invention.
Figure 3:
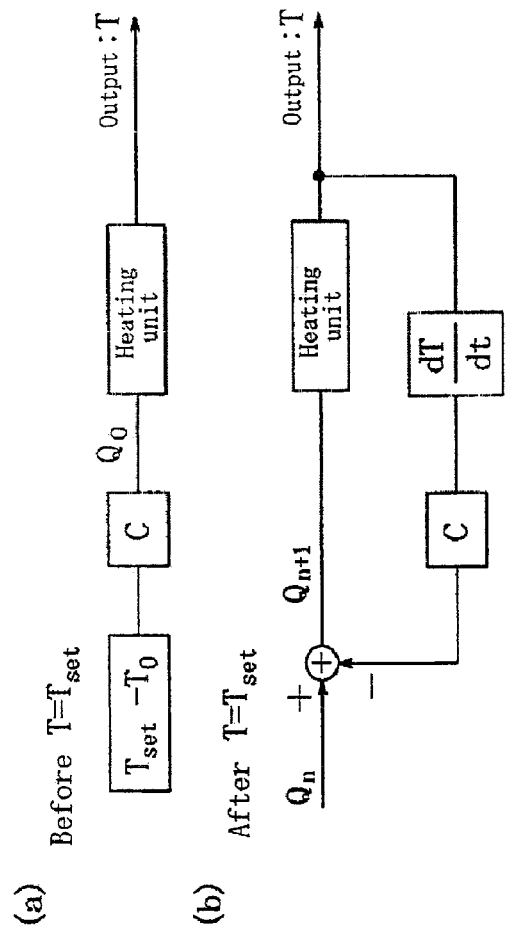
FIG. 3 is a diagram showing an embodiment of an algorithm in a method for temperature control in accordance with present invention.

FIG. 2 is a block diagram showing an embodiment of a temperature controller in accordance with present invention, and FIG. 3 is a diagram showing an embodiment of an algorithm in a control unit of the temperature controller of FIG. 2.

In a temperature controller 10 shown in FIG. 2, an object 12 in which the temperature control is applied is put on a heater 11 composed of a Peltier device, for example. Furthermore, control unit 13 is provided for the temperature controller 10. The control unit 13 sequentially monitors the temperature information from the object 12 and supplies a predetermined amount of electric power to the heater 11 based on the temperature control algorithm shown in FIG. 3 to control the temperature of the object 12.

The temperature control algorithm shown in FIG. 3 is based on the constant temperature control mechanism associated with a homeothermic plant in accordance with the present invention, and comprises a first temperature control process shown in FIG. 3(a) and a second temperature control process shown in FIG. 3(b). In the first temperature control process, the amount of operation of the heater is provided with a fixed value until the temperature of the object 11 reaches a target temperature. In the second temperature control process, the amount of operation of the heater is decided so that the amount of the change in the temperature of the object, per each control cycle, is controlled to be zero after reaching the target temperature.

In the temperature control algorithm shown in FIG. 3, the amount of operation of the heater until the target temperature of the object 11 is reached in the first temperature control process and the amount of operation of the heater needed to maintain the temperature of the target in the second temperature control process may be independently operated respectively, so that time needed for operation may be decreased. Thus, a sufficient and high-speed response is realized in the temperature control of the object 11.

Moreover, because the control coefficient in FIG. 3 is extracted from an actual homeothermic plant, it is possible to derive the control coefficient theoretically. Therefore, a precise and high-speed response may be realized, and it is possible to implement a short time in order to reach the target temperature, as well as provide an accurate and steady maintenance of the temperature of the object 11.

Moreover, because algorithm shown in FIG. 3 does not have an integral element, the conventional pulsation effect is not produced. Thus, it is possible to reach the target temperature in a short time, as well as provide an accurate and steady maintenance of the temperature of the object 11.

In the case of the device shown in FIG. 2, the algorithm control in the control unit 13 follows equation (1) below;

$$\frac{d^2 Q}{dt^2} = C_1 \frac{dQ}{dt} + C_2 Q + C_3 (T_A - T_S) \tag{1}$$

(Q; Calorific value from the heater, $T_S$; Temperature of the heater, $T_A$; Outside temperature, $C_1$-$C_3$; Coefficients of the temperature characteristics of the target object).

The above-described equation (1) is provided by the present inventors based on the analysis of the constant temperature control mechanism of various kinds of homeothermic plants, such as skunk cabbage.

In addition, a second term ($C_2 Q$) and a third term ($C_3 (T_A - T_S)$) in the equation (1) depend on operating the fixed values based on the first temperature process and a first term ($C_1 \cdot dQ/dt$) depends on operating the heater so that the amount of change based on the second temperature control process is made to be zero.

Due to the temperature control algorithm shown in FIG. 3 and equation (1), it is possible to control the object 11 to have a constant temperature precisely and at a high-speed. For example, the temperature control may be achieved with a controlling error of −0.5 degrees Celsius to +0.5 degrees Celsius of the target temperature. In addition, in rising temperature control and falling temperature control, overshoot and undershoot hardly occurs.

The kind of homeothermic plants used in the present invention is not limited, but preferably has superior constant temperature maintenance characteristics. However, skunk cabbage is preferably used.

Figure 4:
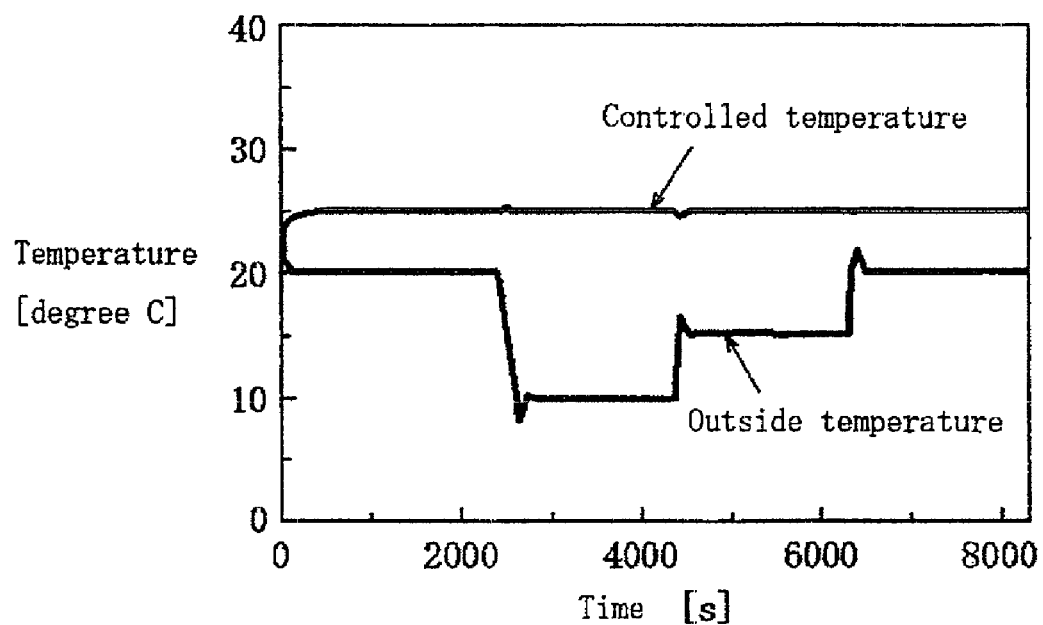
FIG. 4 is a graph showing an embodiment of a constant temperature control based on a method for temperature control and a temperature controller in accordance with the present invention.

FIG. 4 shows a temperature change of the object 11 for an outside temperature change, in the case of using the temperature controller 10 shown in FIG. 2. Temperature control shown in FIG. 4 is conducted based on the algorithm shown in equation (1) extracted from skunk cabbage. As shown in FIG. 4, although the outside temperature changes about 10 degrees Celsius over a predetermined time interval, the temperature of the object 11 is maintained to be almost the same over time.

Figure 5:
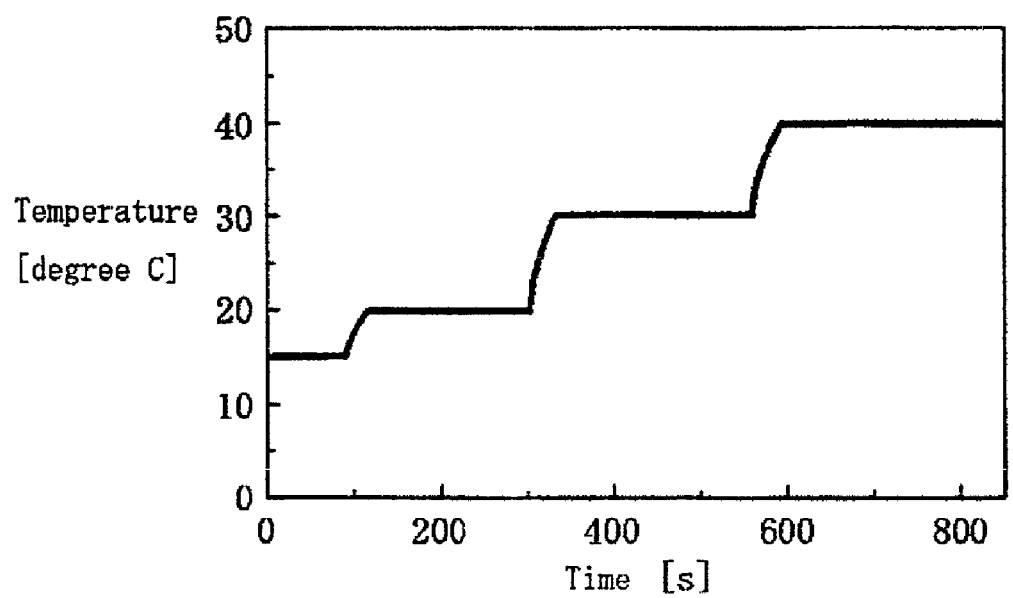
FIG. 5 is a graph showing an embodiment of a raising temperature control based on a method for temperature controlling and a temperature controller in accordance with the present invention.

FIG. 5 shows a rising temperature process, in the case of using the temperature controller 10 shown in FIG. 2. Temperature control shown in FIG. 5 is also conducted based on the algorithm shown in equation (1) extracted from skunk cabbage. As shown in FIG. 5, even during the rising temperature operation over dozens of degrees, neither overshoot nor undershoot is observed, and the rising temperature control is performed with an extremely accurate and high-speed response.

While the present invention has been described in detail and illustrated with reference to specific exemplary embodiments together with some example, the present invention is not limited thereto, and it should be understood that many modifications and substitutions could be made without departing from the spirit and scope of the invention.

The invention claimed is:

1. A method for controlling the temperature of an object to maintain a constant target temperature, the method comprising the steps of:

providing a heater;

providing a control unit in communication with the heater and in communication with a temperature sensor that senses an ambient temperature of the object located on the heater, wherein the control unit monitors the temperature of the object located on the heater and supplies electric power to the heater for controlling the temperature of the object located on the heater, based on a calorific value Q of the heater calculated according to the following equation (1)

$$\frac{d^2Q}{dt^2} = C_1 \frac{dQ}{dt} + C_2 Q + C_3(T_A - T_S); \quad (1)$$

causing the control unit to perform a first temperature control step with respect to the object located on the heater of controlling a heater output, the heater output being provided with a fixed value until the temperature of the object reaches a target temperature; and after the temperature of the object reaches the target temperature, causing the control unit to perform a second temperature control step of controlling the heater output based on formula (1), so that an amount of change in the temperature of the object from the target temperature per each control cycle is controlled to be zero;

wherein in formula (1), Q represents a calorific value from the heater, $T_S$ represents a temperature, of the heater, $T_A$ represents an ambient temperature of the object, and $C_1$-$C_3$ represent adjustable control coefficients of the temperature characteristics of the object, and wherein $C_2Q$ and ($C_3(T_A-T_S)$) depend on operating the fixed values based on the first temperature control step, and ($C_1 \cdot dQ/dt$) depends on operating so that the amount of change based on the second temperature control step becomes zero.

2. A temperature controller for controlling the temperature of an object, the temperature controller comprising:

a first temperature controller, for performing a first temperature control step of monitoring and controlling a temperature an object located on a heater, wherein the first temperature controller, which is in communication with a heater and in communication with a temperature sensor that senses an ambient temperature of the object located on the heater, supplies electric power to the heater to control a heater output, and wherein the heater output is provided with a fixed value until the temperature of the object reaches a target temperature; and a second temperature controller, in communication with the heater and in communication with the temperature sensor, for performing a second temperature control step after the temperature of the object reaches the target temperature, wherein the second temperature controller supplies electric power to the heater to control the heater output based on a calorific value Q of the heater measured by the following equation (1) so that an amount of change in the temperature of the object from the target temperature per each control cycle is controlled to be zero:

$$\frac{d^2Q}{dt^2} = C_1 \frac{dQ}{dt} + C_2 Q + C_3(T_A - T_S) \quad (1)$$

wherein Q represents a calorific value from the heater, $T_S$ represents a temperature of the heater, $T_A$ represents an ambient temperature of the object, and $C_1$-$C_3$ represent adjustable control coefficients of the temperature characteristics of the object, and wherein $C_2Q$ and ($C_3(T_A-T_S)$) depend on operating the fixed values based on the first temperature control step, and ($C_1 \cdot dQ/dt$) depends on operating so that the amount of change based on the second temperature control step becomes zero.

* * * * *